United States Patent
Mollov (10) Patent No.: US 7,122,804 B2
(45) Date of Patent: Oct. 17, 2006

(54) X-RAY IMAGING DEVICE

(75) Inventor: Ivan P. Mollov, Cupertino, CA (US)

(73) Assignee: Varian Medical Systems Technologies, Inc., Palo Alto, CA (US)

( * ) Notice: Subject to any disclaimer, the term of this patent is extended or adjusted under 35 U.S.C. 154(b) by 502 days.

(21) Appl. No.: 10/078,056

(22) Filed: Feb. 15, 2002

(65) Prior Publication Data

US 2005/0285044 A1 Dec. 29, 2005

(51) Int. Cl.
*G01T 1/20* (2006.01)

(52) U.S. Cl. .............................. 250/370.11; 250/370.09
(58) Field of Classification Search ............ 250/370.11, 250/315.3

See application file for complete search history.

(56) References Cited

U.S. PATENT DOCUMENTS

| | | | |
|---|---|---|---|
| 4,104,516 A | 8/1978 | Wang et al. | |
| 4,140,900 A | 2/1979 | Wang | |
| 4,186,302 A | 1/1980 | Wang | |
| 4,300,046 A | 11/1981 | Wang | |
| 4,447,721 A | 5/1984 | Wang | |
| RE31,691 E | 10/1984 | Wang | |
| 4,672,454 A | 6/1987 | Cannella et al. | |
| 4,679,217 A | 7/1987 | Fairchild | |
| 5,079,426 A | 1/1992 | Antonuk et al. | |
| 5,262,649 A | 11/1993 | Antonuk et al. | |
| 5,548,123 A * | 8/1996 | Perez-Mendez et al. | 250/370.11 |
| 5,650,626 A | 7/1997 | Trauernicht et al. | |
| 5,753,921 A * | 5/1998 | Trauernicht et al. | 250/370.09 |
| 5,825,032 A * | 10/1998 | Nonaka et al. | 250/370.09 |
| 5,847,499 A | 12/1998 | Rieppo et al. | |
| 5,949,848 A | 9/1999 | Gilblom | |
| 6,052,432 A | 4/2000 | Rieppo et al. | |
| 6,084,461 A | 7/2000 | Colbeth et al. | |
| 6,171,643 B1 * | 1/2001 | Polischuk et al. | 427/76 |
| 6,222,901 B1 | 4/2001 | Meulenbrugge et al. | |
| 2001/0008271 A1 | 7/2001 | Ikeda et al. | |
| 2003/0015665 A1 * | 1/2003 | Suzuki et al. | 250/370.11 |

FOREIGN PATENT DOCUMENTS

WO 96/34416 10/1996

OTHER PUBLICATIONS

J.H. Siewerdsen, L.E. Antonuk, & J. Yorkston, "Theoretical Performance of Amorphous Silicon Imagers in Diagnostic Radiology" SPIE vol. 2708 pp. 484–493.

* cited by examiner

*Primary Examiner*—John R. Lee
*Assistant Examiner*—Phillip A Johnston
(74) *Attorney, Agent, or Firm*—Blakely, Sokoloff, Taylor & Zafman LLP (57) ABSTRACT

A digital radiography imager having an x-ray converting layer with a first surface adjacent to an energy detection layer and a second surface on an opposite side to the energy detection layer, and the digital radiography imager configured such that x-rays traverse the energy detection layer before propagating through the x-ray converting layer.

63 Claims, 10 Drawing Sheets

X-RAY IMAGING DEVICE

FIELD OF THE INVENTION

The invention relates generally to x-ray imaging devices, and more particularly, to flat panel imagers.

BACKGROUND OF THE INVENTION

Digital radiography imagers provide several advantages compared to traditional film-based x-ray imagers. For example, digital radiography imagers enable physicians to view images in real-time with display monitors, the ability to store and retrieve large amounts of digitized image data, and the ability to transfer image data over high-speed networks. However, problems exist with respect to capturing high-resolution images in a digital format.

One type of digital radiography imager is a flat panel imager that uses a scintillating material to convert x-rays to visible light. An x-ray is a relatively high-energy photon having wavelength in the approximate range from 0.05 angstroms to 100 angstroms. Visible light is electromagnetic radiation that has a wavelength in the range from about 3,900 to about 7,700 angstroms and that may be perceived by the unaided, human eye.

Figure 1A:
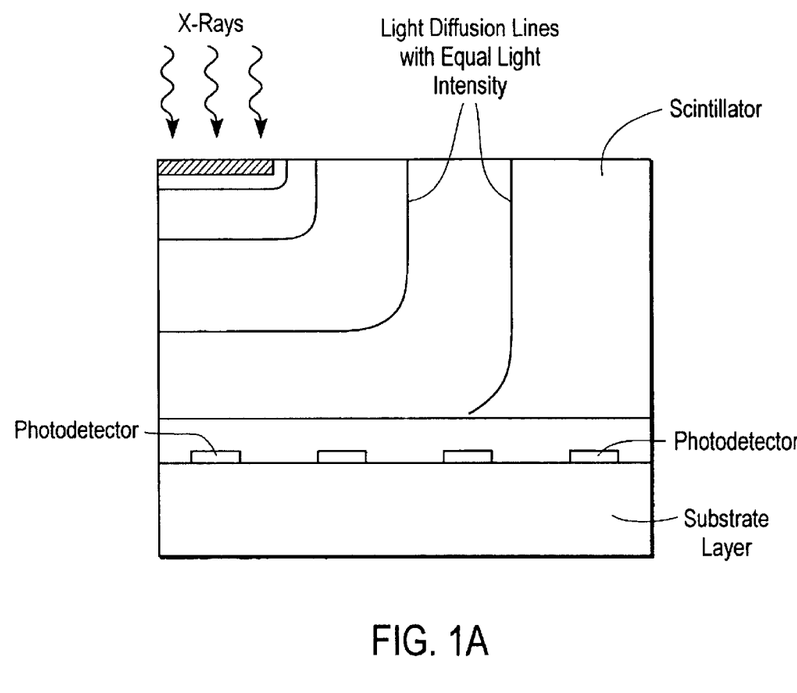
FIG. 1A illustrates a side view of a prior art digital radiography imager.

The flat panel imager is constructed as a panel with a matrix of photosensitive devices with readout electronics to transfer the light intensity of a pixel to a digital video signal for further processing or viewing. An x-ray scintillator placed on top of the photosensitive devices becomes sensitive to x-rays, and can be used in a variety of medical and industrial applications. FIG. 1A illustrates a cross-sectional view of a prior art flat panel imager. When a pattern of x-rays is applied to the top side of a scintillator, it produces visible light with diminishing intensity as the x-rays propagate deeper into the scintillator. Photosensitive devices capture the light produced in the scintillator, and the electrical signal is further amplified and processed.

The amount of applied x-rays converted to light depends, among other things, on the thickness of the scintillator. The thicker the scintillator, the greater the amount of light produced. However, as the scintillator gets thicker, less of the generated light reaches the photosensitive devices, because the brightest area is near the side of the scintillator that is opposite to the side that faces the photosensitive devices.

These scintillator properties contradict each other, and for every scintillator material, structure, and x-ray energy, there is an optimal thickness that produces maximum signal on the photosensitive devices. The thickness of the scintillator also affects the sharpness of the image produced, because the light generated in the scintillator diffuses in all directions and smoothes sharp edges in the x-ray pattern. As shown in FIG. 1A, the thicker scintillator diffuses light further away from the edge of the x-ray pattern, and subsequently degrades image quality.

The basic disadvantage of the prior art flat panel construction as illustrated in FIG. 1A is the low efficiency of transferring light, produced in the scintillator, to the photosensitive devices. In some cases, 60% or more of the light may not exit the scintillator. This reduces the electrical signal produced by the photosensitive devices, lowers the signal to noise ratio as well as spatial resolution in the images. Signal to noise ratio is the level of x-ray intensity detected by the imager relative to interferences caused by electrical noise or quantum x-ray noise. Spatial resolution is the ability to discern between small features of the image.

Various flat panel imager constructions have been attempted to improve the efficiency of the scintillator-based imagers. One flat panel configuration places a mirror on the x-ray side of the scintillator to return the light generated at the x-ray side of the scintillator back into the scintillator, and eventually to the photodiode devices. In another configuration, the scintillator material is grown to have columnar structure to reduce the horizontal (as illustrated in FIG. 1A) diffusion of the generated light, and thus improve image quality. However, in both configurations, the light diffuses within the scintillator, and even with a columnar scintillator, the image quality degrades. In some cases, to improve efficiency, the thickness of the scintillator may be increased to be several times bigger than the pixel size. However, the problem of light diffusion within the scintillator still exists.

Figure 1B:
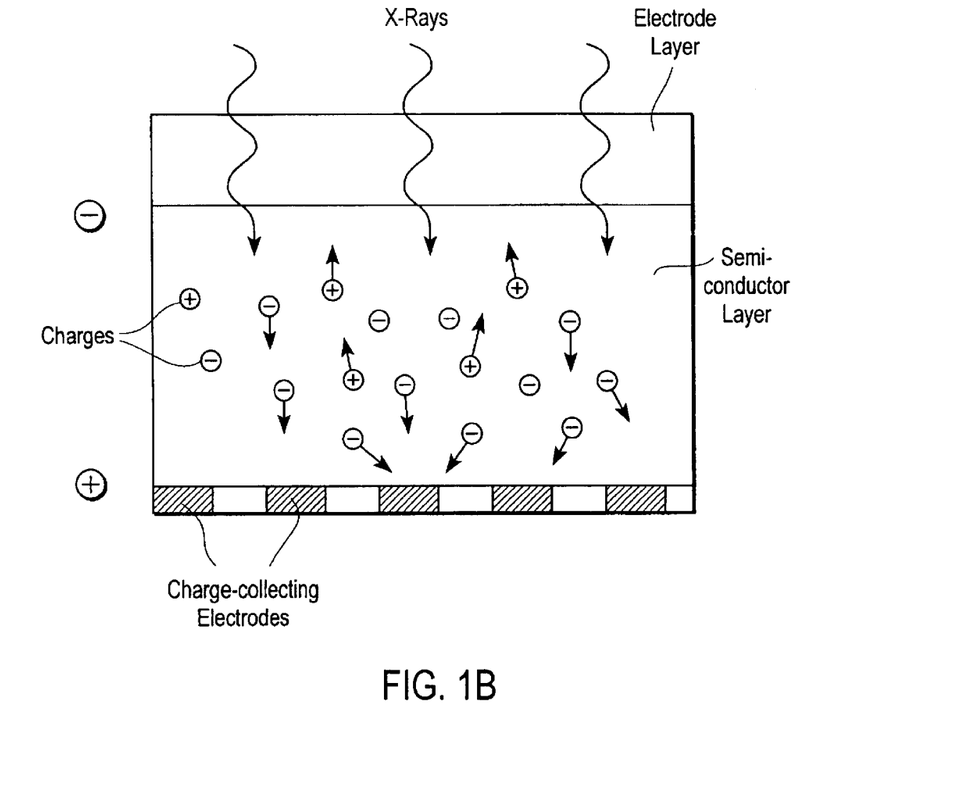
FIG. 1B illustrates another prior art digital radiography imager.

Another type of a prior art digital radiography imager is a flat panel imager that uses semiconductor material to convert x-rays to electric charges directly, without an intermediate step of converting x-rays to visible light. FIG. 1B illustrates one example of a prior art flat panel imager that converts x-ray energy directly. The flat panel imager has semiconductor layer disposed between a top electrode layer and charge-collection electrode layer. An electric field is applied across semiconductor layer incident to the top electrode. As x-rays propagate through the semiconductor layer through the top electrode, it creates electric charges within the semiconductor layer that are drawn to the charge-collection layer. The charge is collected, amplified and quantified to a digital code for a corresponding pixel.

Analogous to the scintillator-based imager described in FIG. 1A, the thickness of the semiconductor layer may affect the charge collection efficiency of charge collection layer. Thus, depending on the semiconductor material used, it may be difficult and burdensome to achieve optimum semiconductor thickness.

SUMMARY OF THE INVENTION

This invention relates to a digital radiography imager having an x-ray converting layer with a first surface adjacent to an energy detection layer and a second surface on an opposite side to the energy detection layer. The digital radiography imager is configured such that x-rays traverse the energy detection layer before propagating through the x-ray converting layer.

BRIEF DESCRIPTION OF THE DRAWINGS

The present invention is illustrated by way of example, and not limitation, in the figures of the accompanying drawings.

DETAILED DESCRIPTION

In the following description, numerous specific details are set forth such as examples of specific, components, circuits, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

A digital radiography imager is described. In one embodiment, the digital radiography imager may be a multi-layer, flat panel imager. The flat panel imager includes a scintillator layer that generates visible light from x-rays absorbed through it. A photodiode layer detects the visible light to generate electrical charges to produce a pixel-based image.

The imager may have a photodiode layer disposed above a protective layer, a light transparent layer disposed above the photodiode layer, a scintillator layer disposed above the light transparent layer, and a mirror layer disposed above the scintillator layer. The scintillator layer has a first surface adjacent to the light transparent layer and a second surface adjacent to the mirror layer. In an alternate embodiment, the imager may include other layers, for example, a substrate layer disposed between the photodiode layer and the protective layer. The imager is configured such that x-rays traverse the photodiode layer before propagating through the scintillator layer.

For the purpose of describing some of the embodiments of this invention, terms such as "disposed above," "disposed below," "disposed between," and similar language are used to describe the relative positioning of, e.g., one layer with respect to another layer in an arbitrary reference frame (e.g., that of a figure) and are not meant to imply any absolute orientation of the device with respect to, for example, the earth's surface. Moreover, such terminology does not preclude the presence of intervening layers between the layers under discussion.

By absorbing x-rays from the photodiode side first, the scintillator produces a light intensity that may be greatest near the photodiodes. Light energy collection by the photodiodes may be more efficient, thereby increasing the signal to noise ratio and spatial resolution of a digitized image. A thickness of the scintillator may no longer be a factor in x-ray absorption to produce sufficient light for imaging. In one embodiment, the flat panel imager may be integrated with a charge-coupled device ("CCD") photosensor. In another embodiment, the flat panel imager may be integrated with a complementary metal oxide semiconductor ("CMOS") photosensor. A discussion of CCD and CMOS photosensors is provided further below.

In another embodiment, the flat panel imager may convert x-ray energy directly to electrical charges, through the use of a semiconductor. The flat panel imager has a semiconductor layer disposed above a charge-collection layer, and a bias electrode layer disposed above the semiconductor layer. The bias electrode generates an electric field within the semiconductor layer. The flat panel imager is configured to receive x-rays through the charge-collection layer before propagating through the semiconductor layer. In one embodiment, the flat panel imager may be integrated with TFT switches or with switching diodes.

The digital radiography imager may be used as part of a digital radiography system. The system has an x-ray source to transmit x-rays towards a diagnostic region of a patient. On an opposite side of the patient, a radiography imager receives the x-rays and produces a digitized image. In one embodiment, the radiography imager is a flat panel imager. The imager may have a photodiode layer disposed above a protective layer, a light transparent layer disposed above the photodiode layer, a scintillator layer disposed above the light transparent layer, and a mirror layer disposed above the scintillator layer. A display system may be coupled to the radiography imager. The display system enables real-time viewing of the digitized image.

Figure 2:
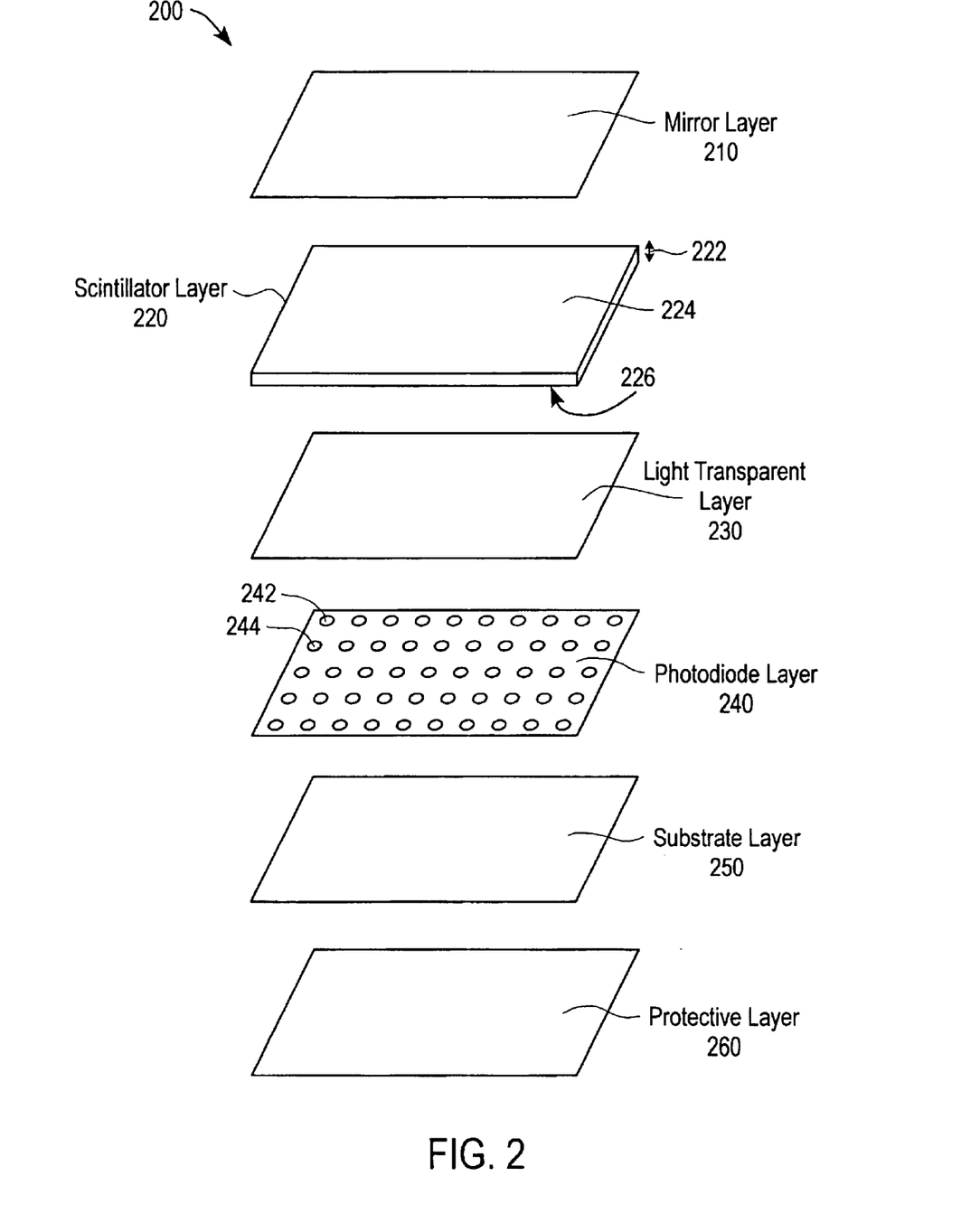
FIG. 2 illustrates one embodiment of a digital radiography imager shown in an exploded view.

FIG. 2 illustrates one embodiment of a radiography imager in an exploded view. In one embodiment, digital radiography imager 200 may be a flat panel imager. The conversion of x-rays to electrical charge may involve a two-step process. First, the x-rays produce visible light by passing through an energy converting layer such as a scintillator. Next, a light detection layer, such as photodiode detectors, converts the visible light to electrical charges. The imager may be integrated with a CCD-based or a CMOS-based photodetectors.

In one embodiment, imager 200 has mirror layer 210, scintillator layer 220, light transparent layer 230, photodiode layer 240, substrate layer 250 and protective layer 260. Photodiodes 242, 244 are representative of a photodiode array that forms photodiode layer 240 disposed above substrate layer 250. In one embodiment, mirror layer 210 is disposed above scintillator layer 220, and scintillator layer 220 is disposed above light transparent layer 230. Light transparent layer 230 is disposed above photodiode layer 240, and photodiode layer 240 is disposed above substrate layer 250. Substrate layer 250 is disposed above protective layer 260.

Scintillator layer 220 absorbs x-rays and generates visible light corresponding to the amount of x-ray absorbed. Photodiode layer 240 detects the light corresponding to the amount of x-ray absorbed. Photodiode layer 240 converts the visible light to electric charges to generate a pixel pattern on a display such as, for example, display 660 of FIG. 6. As discussed above, when x-rays are received in a direction first through mirror layer 210, a thickness 222 of scintillator 220 plays an important part in producing a sufficient amount of visible light to form a viable image.

Radiography imager 200 is configured such that x-rays may be received in a direction from protective layer 260. In this configuration, the x-ray visible light (i.e., light intensity) generated by scintillator layer 220 is greater near a first surface 226 of scintillator 220, which is closer to representative photodiodes 242, 244, compared to a second surface 224 of scintillator 220. As such, photodiode layer 240 may convert more visible light to electrical charges to produce a pixel-based image on a display. Mirror 210 serves to reflect visible light produced by scintillator layer 220 back towards photodiode layer 240. In this way, the amount of visible light captured for detection may be maximized.

Additionally, thickness 222 of scintillator layer 220 may no longer be a determining factor in producing a viable image. The thickness 222 of scintillator layer 220 may be substantially reduced and yet generate enough visible light from x-rays and reflect the visible light to photodiodes layer 240. In doing so, productions costs for radiography imager 200 may be reduced.

Figure 8:
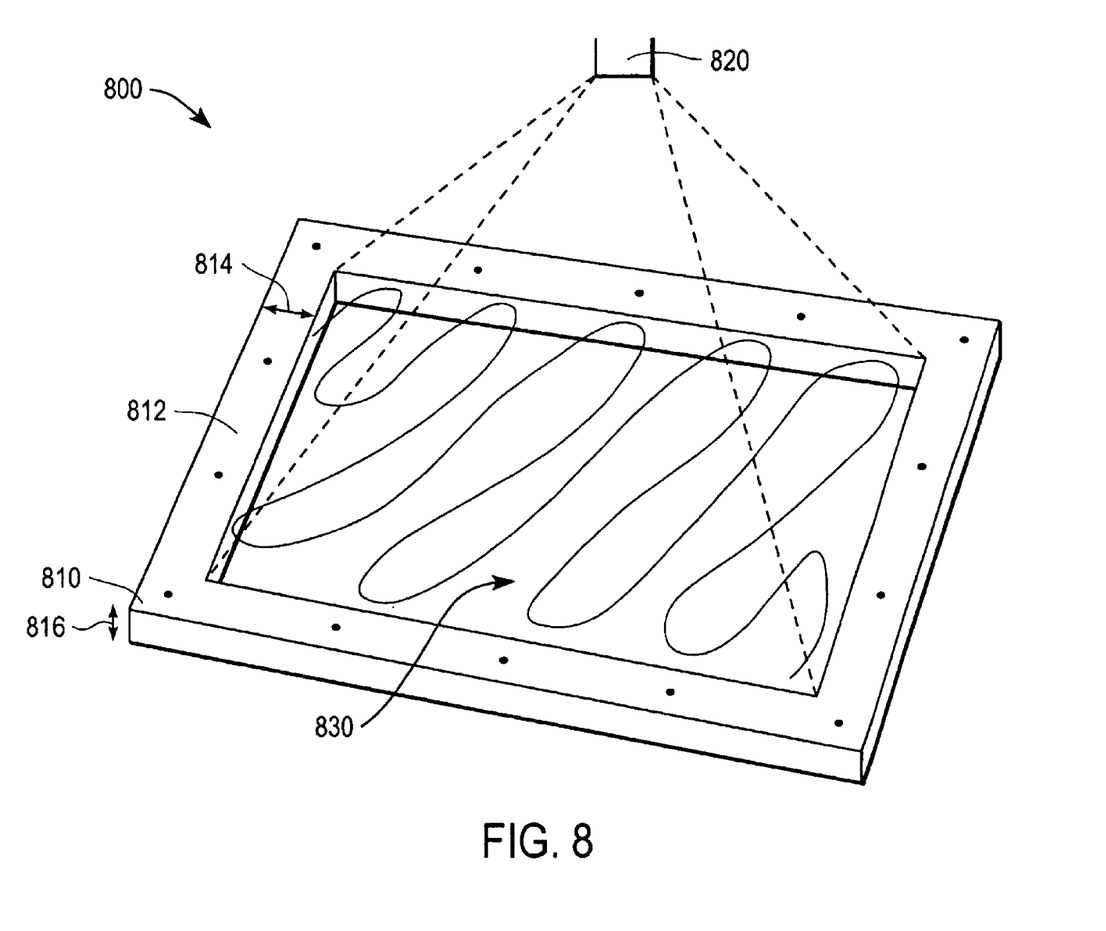
FIG. 8 illustrates one embodiment of a digital radiography imager within a casing.

Protective layer 260 may be part of an imager casing (e.g., casing 810 of FIG. 8). It is usually disposed near an outer side of imager 200. As such, the placement of this layer is not important for maximizing the light intensity near photodiode layer 240.

In one embodiment, light transparent layer 230 covers photodiode layer and may be made of any material that has low x-ray and light energy absorption. Light transparent layer 230 serves to protect photodiode layer 240 because the photodiodes such as representative photodiodes 242, 244 may be sensitive elements that may be damaged easily during normal use and handling. Materials for light transparent layer 230 may include silicon oxide, silicon nitride, and related polymers.

In an alternative embodiment, substrate layer 250 is disposed below photodiode layer 240. Substrate 250 may be made of a material that has low attenuation or x-ray absorption. A substrate that absorbs x-rays may detrimentally reduce the corresponding light intensity generated by scintillator 230. Substrate layer 250 may be made from silicon. In one embodiment, substrate layer 250 is a glass material. Materials for making substrate 250 are well known in the art and as such, a detailed description is not provided herein.

Protective layer 260 may be made of any material that has low x-ray absorption. For example, protective layer 260 may be made of carbon fiber material including carbon fiber, plastic, and aluminum. Protective layer 260 should be transparent to x-rays but not for light.

FIG. 8 illustrates a top view of one embodiment of a radiography imager 800 housed in casing 810. Casing 810 holds together the various layers of radiography imager (e.g., mirror layer 210, scintillator layer 220, and photodiode layer 240 described above with respect to FIG. 2).

Casing 810 forms a frame 812 having a width 814 and a thickness 816 about the edge of radiography imager 800. Thickness 816 is large enough to include all the layers of radiography imager 800. Width 814 of frame 812 creates aperture 830 that defines an area to receive x-rays, for example, from x-ray source 820. The size of aperture 830 may be variable, depending on size of the object being imaged. For example, radiography imager 800 may have a large aperture 830 for a chest image compared to a smaller aperture 830 for a breast image.

Figure 3:
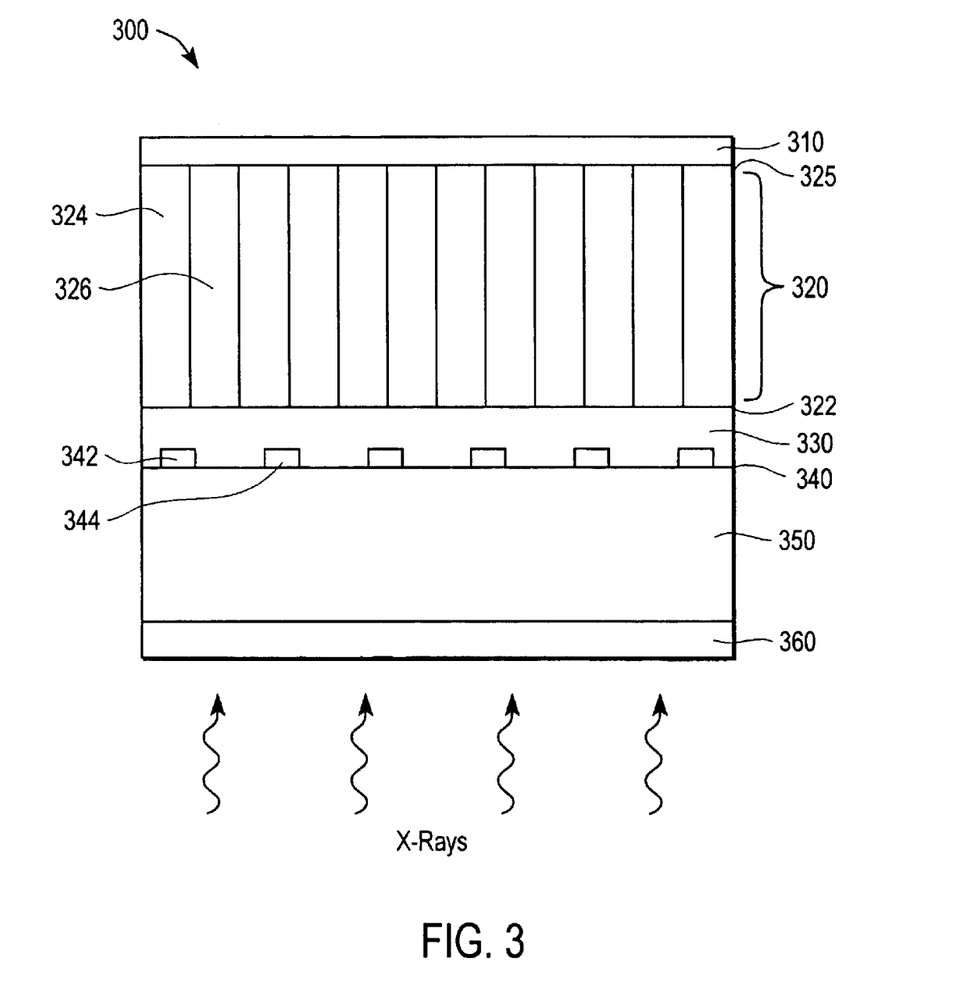
FIG. 3 illustrates one embodiment of a digital radiography imager shown in a cross-sectional view.

FIG. 3 illustrates a cross-sectional view of one embodiment of a digital radiography imager 300. In one embodiment, digital radiography imager 300 may be a flat panel imager. Digital radiography imager 300 has mirror layer 310, scintillator layer 320, light transparent layer 330, photodiode layer 340, substrate layer 350 and protective layer 360. Photodiodes 342, 344 are representative of a photodiode array that forms photodiode layer 340 disposed above substrate layer 340.

In one embodiment, mirror layer 310 is disposed above scintillator layer 320, and scintillator layer 320 is disposed above light transparent layer 330. Light transparent layer 330 is disposed above photodiode layer 340, and photodiode layer 340 is disposed above substrate layer 350. Substrate layer 350 is disposed above protective layer 360. Scintillator layer 320 has first surface 322 adjacent to light transparent layer 330 and second surface 325 adjacent to mirror layer 310. In an alternative embodiment, substrate layer 350 may be absent from imager 300. Substrate layer 350 may not be necessary so that photodiode layer 340 is disposed directly above protective layer 360. Scintillator layer 320 or protective layer 360 may serve as the substrate for imager 300.

Digital radiography imager 300 is configured such that x-rays may be received in a direction from protective layer 360. The x-rays propagate through photodiode layer 340 incident to first surface 322 before propagating through scintillator layer 320. In this configuration, the most intense visible light is generated near first surface 322 of scintillator 320 that is closest to photodiode layer 340. However, if the x-rays were received in a direction from mirror layer and incident to second surface 325 of scintillator 320, the most intense visible light generated would be near second surface 325.

It would not be obvious to receive x-rays in a direction from photodiode layer 340 because of the concern for providing enough scintillator thickness, so that a viable amount of x-ray energy could be absorbed to generate visible light. However, because digital radiography imager 300 is configured such that x-ray traverse the photodiode layer first, scintillator thickness may no longer be a significant factor in balancing x-ray absorption with light diffusion. In one embodiment, scintillator 320 may have thickness greater than conventional scintillator thickness. In another embodiment, scintillator 320 may be thinner than conventional thickness, or just thin enough to generate visible light and reflect the light towards photodiode layer 340.

As discussed above, a scintillator is a material that absorbs x-rays to generate visible light. An ideal scintillator yields the maximum amount of light photons for each incoming x-ray photon; 20 to 50 visible photons per 1KeV of incoming x-rays energy are typical. Scintillators usually consist of a high-atomic number material, which has high x-ray absorption. In one embodiment, scintillators may be granular like phosphors. Phosphors are materials that glow when exposed to x-rays. For maximum brightness, phosphors used in x-ray imaging are made of rare-earth oxysulfides doped with other rare earths. The scintillator material may include cesium iodide ("CsI"), gadolinium oxysulphide ("GOS"), and other loaded fibers.

Scintillators may also be made from other materials, for example, cesium iodide. Cesium and iodine also have high atomic numbers. Cesium iodide has a property of growing as a dense array of needles. This produces crystals that act as column-like paths for the light photons generated near the x-ray input side of the scintillator. FIG. 3 illustrates scintillator 320 structured with light columns to direct light photons from one end to another of scintillator 320. Individual light columns 324, 326 are representative of the columns of scintillator 320. In one embodiment, for example, x-rays propagating through mirror layer 310 are converted to visible light by scintillator 320. Columnar structures 324, 326 may direct the light towards photodiode layer 340, thereby minimizing light diffusion caused by the distance the light have to travel through scintillator 320 to reach photodiode layer 340.

In one embodiment, x-rays may be absorbed in a direction from protective layer 360 towards mirror layer 310. As such, scintillator 320 absorbs the x-rays at first surface 322 that is adjacent to photodiode layer 340. Columnar structures (e.g., 324, 326) of scintillator 320 enable visible light to target the photodiodes (e.g., 342, 344) on photodiode layer 340 by reflecting the light back towards the photodiodes. Thus flat panel imager 300 having scintillator 320 with columnar structures, combined with a configuration to receive x-rays through scintillator 320 at first surface 322 that faces photodiode layer 340 may increase further the efficiency of light detection to produce an image.

Substrate 350 may be made of a material that has low attenuation or absorption of x-rays. A substrate that absorbs x-rays may detrimentally reduce the corresponding light intensity generated by scintillator 320. This may have an effect of requiring higher radiation doses to compensate for the reduction in x-ray energy after passing through substrate layer 350. In one embodiment, substrate layer 350 is made from silicon. In another embodiment, substrate layer 350 is a glass material. Materials for making substrate 350 are well known in the art and as such, a detailed description is not provided herein.

In one embodiment, substrate 350 may have a thickness of approximately 1.1 millimeters. Photodiodes 342, 344 may each have a thickness of approximately 2 microns. Scintillator layer 320 may have a thickness of approximately 0.6 millimeters.

Figure 4:
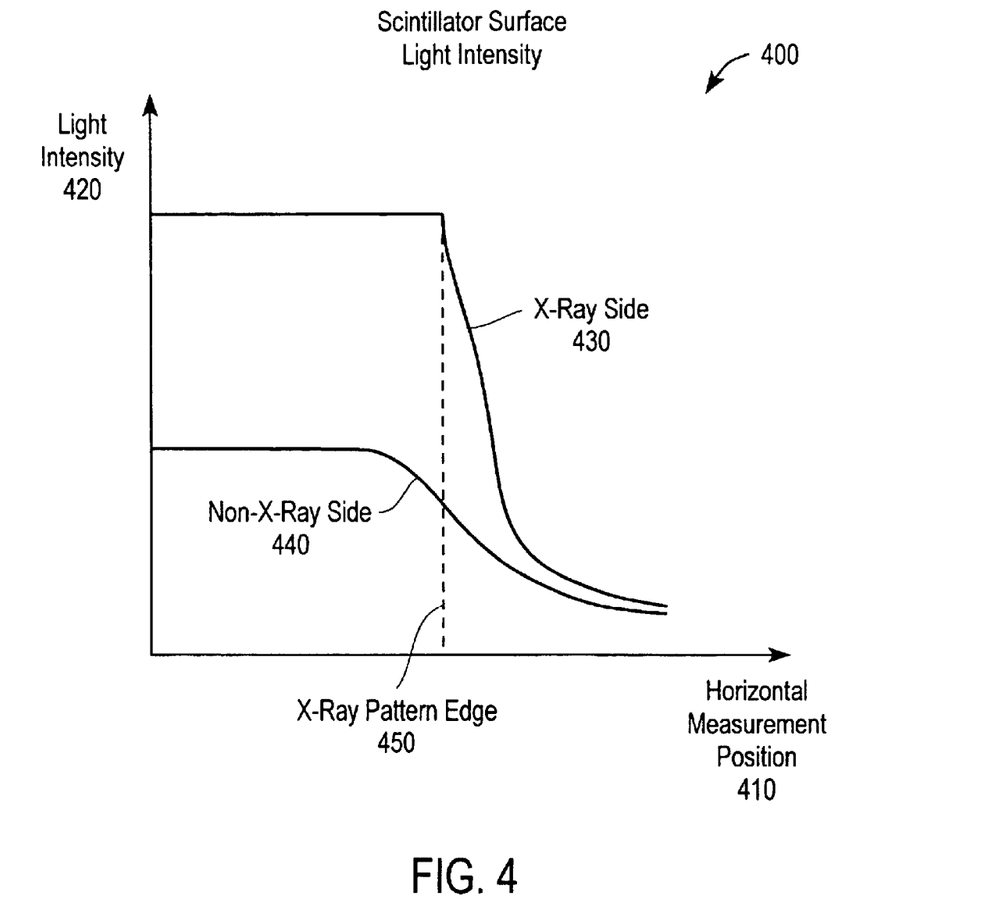
FIG. 4 illustrates a graph showing light intensity at an x-ray input surface and a non-input surface of a scintillator.

FIG. 4 illustrates, in graphical form, the advantage of having a digital radiography imager (i.e., a flat panel imager) configured to receive x-rays near or at a scintillator surface closest to the photodiode layer. Graph 400 may be interpreted with respect to FIGS. 1A and 3. Horizontal axis 410 represents a horizontal measurement position on the surface of a scintillator—either an x-ray input surface or an opposite, x-ray output surface. Vertical axis 420 represents visible light intensity generated by the scintillator. X-ray pattern edge 450 shows a horizontal length of a scintillator.

Profile 430 corresponds to light intensity measured at an x-ray input surface of the scintillator. Profile 440 corresponds to light intensity measured at a surface opposite the x-ray input surface. In one embodiment, profile 430 may correspond to light intensity near first surface 322 as illustrated in FIG. 3. Profile 440 may correspond to light intensity near second surface 325. Graph 400 suggests that light intensity is far greater at the x-ray input surface compared to the non-x-ray surface, particularly up to x-ray pattern edge 450. Thus, by detecting visible light at a scintillator surface corresponding to the x-ray input surface, it may be expected that both signal to noise ratio and the spatial resolution may improve up to 100%, compared to detecting light energy at a scintillator surface opposite to the x-ray input surface. Beyond x-ray pattern edge 450, light intensity 420 for profiles 430 and 440 decays exponentially.

Figure 5:
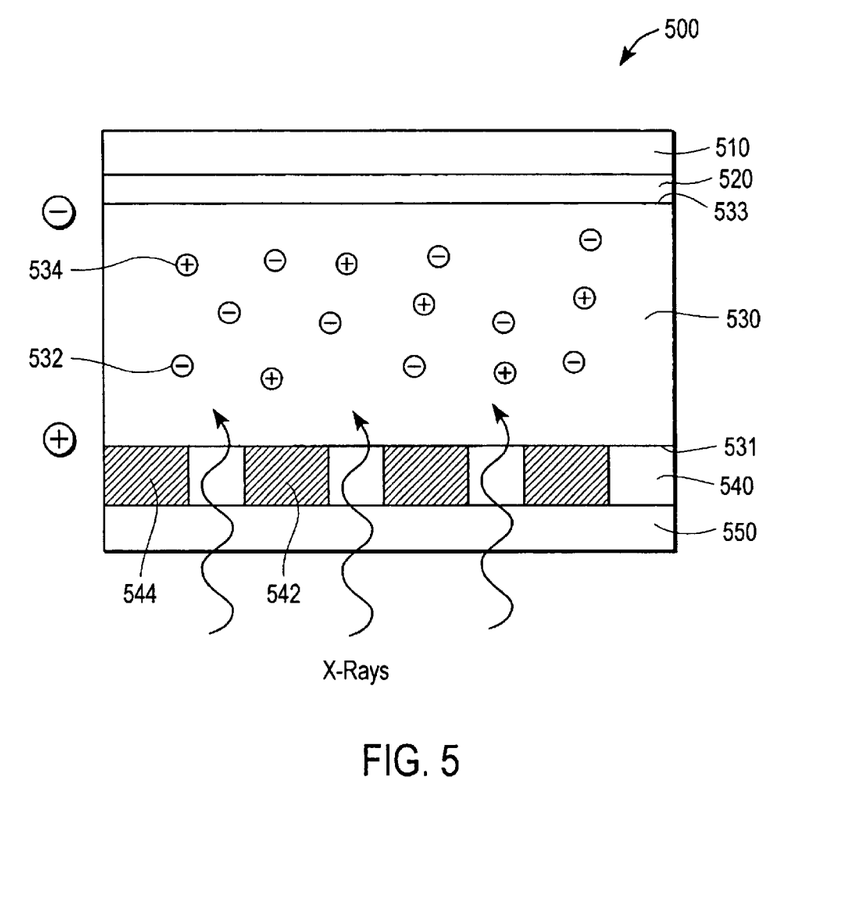
FIG. 5 illustrates one embodiment of a digital radiography imager in a cross-sectional view.

In another embodiment, the digital radiography imager may be a flat panel imager that converts x-rays to electrical charges directly without a scintillator layer (i.e., direct x-ray imager). This type of imager substitutes a semiconductor or photoconductor layer for the scintillator layer. In describing the following figures, the terms "semiconductor" and "photoconductor" are used interchangeably in describing a direct conversion x-ray imager. FIG. 5 illustrates a cross-sectional view of one embodiment of semiconductor-based flat panel imager. Imager 500 has bias electrode layer 520, semiconductor layer 530, charge collection layer 540, and substrate layer 550. In an alternative embodiment, a printed circuit board ("PCB") layer 510 may be disposed above bias electrode layer 520. Bias electrode layer 520 is disposed above semiconductor layer 530. Semiconductor layer 530 is disposed above charge-collection layer 540, and charge-collection layer 540 is disposed above substrate layer 550. Charge-collection layer 540 has an array of charge-collection electrodes (e.g., electrodes 542, 544). Charge-Semiconductor layer 530 has first surface 531 adjacent to charge-collection layer 540. Semiconductor layer 530 also has second surface 533 adjacent to bias electrode layer 520. An electric field is applied across the semiconductor layer through electrode layer 520.

In use, x-rays propagate through the layers of flat panel imager 500. Flat panel imager 500 is configured such that x-rays traverse charge-collection layer 540 and incident to first surface 531 of semiconductor layer 530 before the x-rays propagate through semiconductor layer 530. As semiconductor layer 530 absorbs the x-rays, electrical charges, representative of charges 532, 534, are drawn towards charge-collection electrodes (e.g., 542, 544) of charge-collection layer 540. The charges may be collected, amplified and quantified to a digital code for corresponding pixels to produce an image.

In one embodiment of the present invention, as illustrated in FIG. 5, x-rays propagate through first surface 531 of semiconductor layer 530. Because first surface 531 is adjacent to charge-collection layer 540, electrical charges (e.g., 532, 534) do not have to travel across a thickness of semiconductor layer 530 to reach charge collection layer 540. As such, the diffusion of the electrical charges (e.g., 532, 534) may be minimized, and the efficiency of charge-collection layer 540 may be greater compared to propagating x-rays incident at second surface 533 of scintillator 530. For semiconductor (photodetector)-based imagers, the semiconductor material may include amorphous selenium ("a-Se"), lead oxide iodide and oxide, mercuric iodide, CdTe and CdZnTe.

In both scintillator and semiconductor-based flat panel imagers (e.g., FIGS. 3 and 5, respectively), the electric charge pattern generated may be sensed by an electronic readout mechanism to produce a digital image. In one embodiment, flat panel imagers may have readout mechanisms based on arrays of amorphous silicon (a-Si) thin-film transistors ("TFTs") or switching diodes. The TFT arrays may be deposited onto the substrate in multiple layers with either the photodiodes or charge-collection electrodes disposed on top or in the same plane as the TFTs. As such, TFT arrays are typically adjacent to the site of x-ray absorption and detection. This configuration enables the flat panel imager to be thin and cover a large image area.

Scintillator-based flat panel imagers may also incorporate readout mechanisms based on charge-couple devices ("CCD"). CCD imagers have a series of metal oxide semiconductor capacitors that are fabricated very close together on a semiconductor surface. Optics may be used to capture light emitted from the scintillator.

Figure 6:
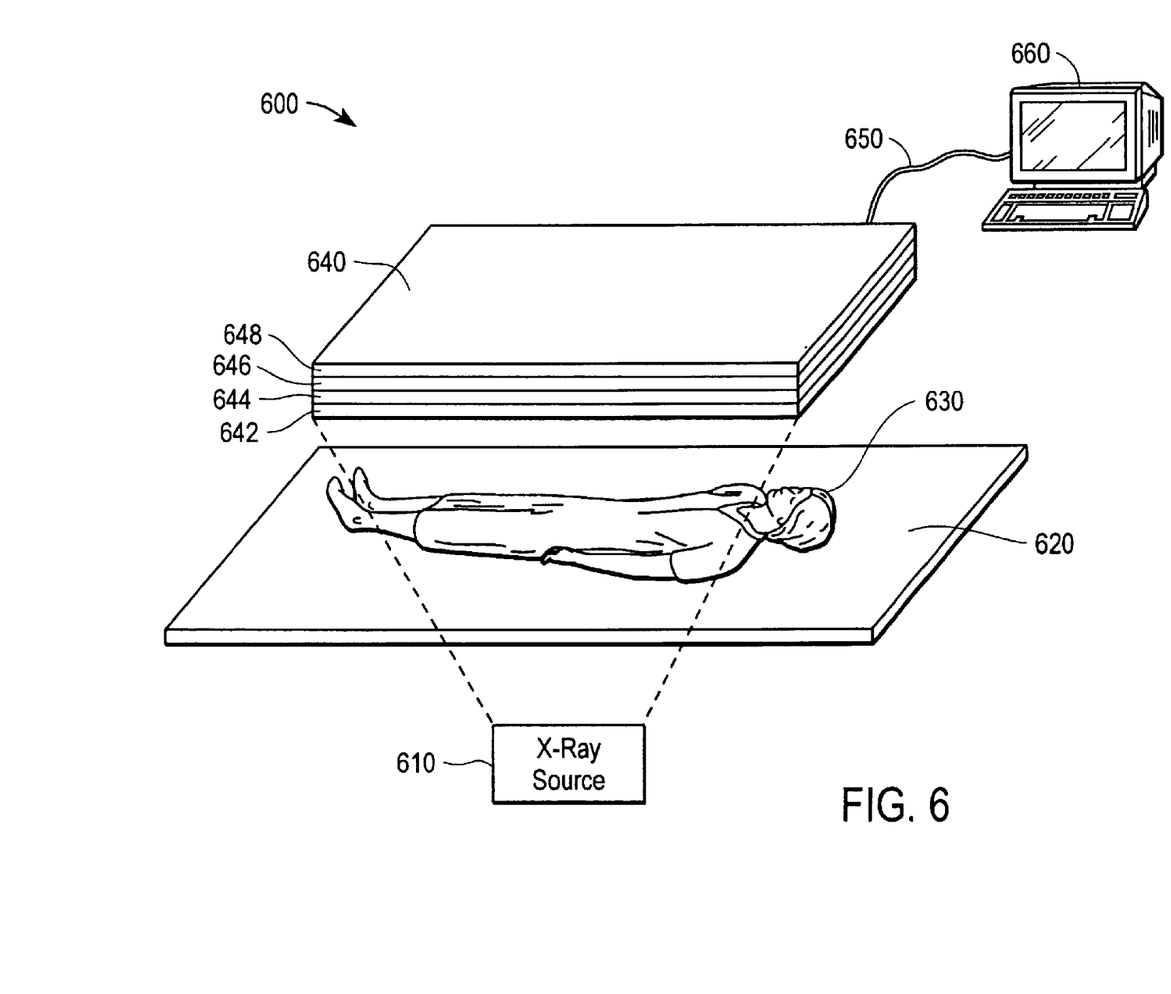
FIG. 6 illustrates one embodiment of a digital radiography system.

FIG. 6 illustrates one embodiment of a digital radiography system 600 employing a flat panel imager. Patient 630 rests on support 620 between x-ray source 610 and flat panel imager 640. Flat panel imager 640 has photodiode layer 644 disposed above protective layer 642. Scintillator layer 646 is disposed above photodiode layer 644. Mirror layer 648 is disposed above scintillator layer 646. Scintillator 646 has a first surface (not shown) adjacent to photodiode layer 644 and a second surface (not shown) adjacent to mirror layer 648. In an alternative embodiment, a substrate layer (not shown) may be disposed between photodiode layer 644 and protective layer. In addition, a light transparent layer (not shown) may be disposed between scintillator layer 646 and photodiode layer 644.

X-rays propagate through a portion of patient 630 and is received by flat panel imager 640 to produce a digitized image. Flat panel imager 640 is configured such that x-rays propagate through photodiode layer 644 and incident to the first surface of scintillator 646 that is adjacent to photodiode layer 644. As such, this configuration of imager 640 enables scintillator 646 to maximize the intensity of visible light near photodiode layer 644 to produce the best possible image. In another embodiment, flat panel imager 640 may be the type of imager that directly converts x-rays to light, without a scintillator, as described with respect to FIG. 5.

Figure 7A:
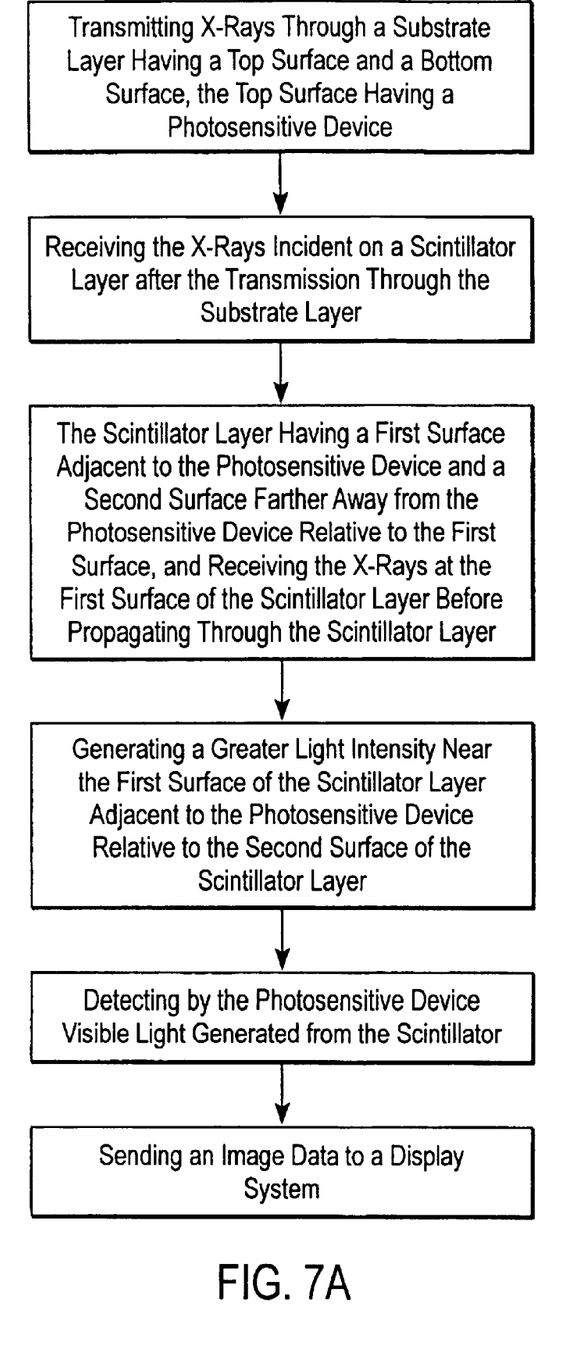
FIG. 7A illustrates one embodiment of a method of imaging.

An imaging method is also described. In one embodiment, a flat panel imager may be utilized. X-rays are transmitted through a substrate layer having a top surface and a bottom surface. The top surface has a photosensitive device, for example, photodiodes. The x-rays are received by the flat panel imager incident on a scintillator layer after transmission through the substrate layer. The scintillator layer has a first surface adjacent to the photosensitive device, and a second surface farther away from the photosensitive device relative to the first surface. In an alternative embodiment, a mirror layer may be disposed adjacent to the second surface of the scintillator layer. In addition, a protective layer may be disposed adjacent to the bottom surface of the substrate layer.

X-rays are received at the first surface of the scintillator layer before propagating through the scintillator layer. The photosensitive device detects visible light generated by the scintillator layer. A greater light intensity is generated at the first surface relative to the second surface of the scintillator layer. The flat panel imager produces a digital image of the object. The flat panel imager may send an image data to a display system for real-time viewing.

Figure 7B:
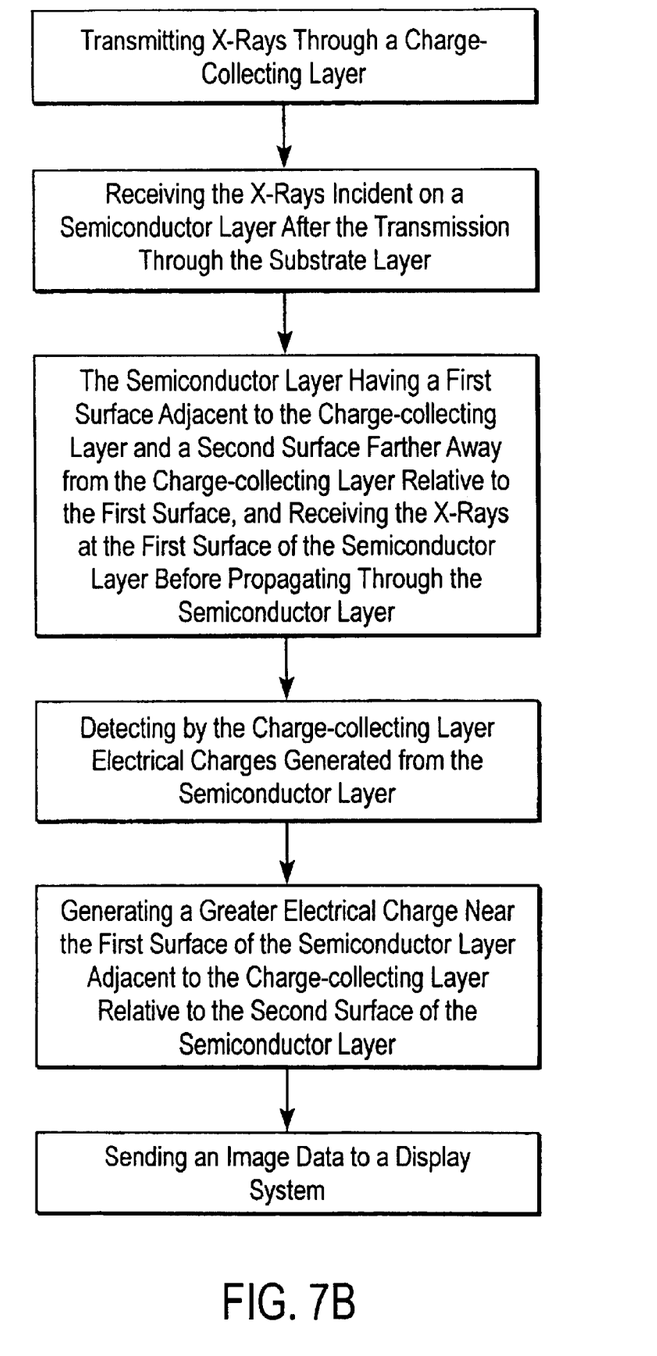
FIG. 7B illustrates an alternative embodiment of a method of imaging.

In another embodiment of an imaging method, x-rays are received incident on a semiconductor layer after transmission through a charge-collection layer of a flat panel imager. The charge-collection layer has an array of charge-collection electrodes. The semiconductor layer has a first surface adjacent to the charge-collection layer, and a second surface farther away from the charge-collection layer relative to the first surface. In addition, a protective layer may be disposed adjacent to a surface of the charge-collection layer farther away relative to the semiconductor layer.

An electrical field is applied across the semiconductor layer. The x-rays are received at the first surface of the semiconductor layer after the x-rays propagate through the semiconductor layer. The charge-collection layer detects electrical charges from the semiconductor layer corresponding to x-rays absorbed by the semiconductor layer. The semiconductor layer generates greater electrical charge near the first surface of the semiconductor layer adjacent to the charge-collection layer relative to the second surface of the semiconductor layer. The flat panel imager produces a digital image of the object. The flat panel imager may send an image data to a display system for real-time viewing.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A digital radiography imager, comprising:
   a single energy detection layer; and
   an x-ray converting layer disposed above the single energy detection layer, wherein the single energy detection layer is coupled to receive light from the x-ray converting layer, wherein the x-ray converting layer has a first surface adjacent to the single energy detection layer and a second surface on an opposite side to that of the first surface and wherein the digital radiography imager is configured such that x-rays traverse the single energy detection layer before propagating through the x-ray converting layer.

2. The digital radiography imager of claim 1, wherein an intensity level corresponding to the x-rays received by the imager is greater near the first surface relative to the second surface of the x-ray converting layer.

3. The digital radiography imager of claim 2, wherein the x-ray converting layer comprises a scintillating material to produce visible light from x-rays.

4. The digital radiography imager of claim 3, wherein the single energy detection layer comprises photodiodes to detect the visible light.

5. The digital radiography imager of claim 2, wherein the x-ray converting layer comprises a semiconductor material to draw electrical charges across the semiconductor material.

6. The digital radiography imager of claim 2, wherein the x-ray converting layer comprises a photoconductor material to produce electrical charges across the photoconductor material.

7. The digital radiography imager of claim 5, wherein the single energy detection layer comprises a plurality of charge-collection electrodes to collect the electrical charges.

8. The digital radiography imager of claim 1, further comprising a protective layer disposed below the single energy detection layer.

9. The digital radiography imager of claim 8, further comprising a substrate layer disposed between the single energy detection layer and the protective layer.

10. A flat panel imager, comprising:
    a photodiode layer;
    a light transparent layer disposed above the photodiode layer; and
    a scintillator layer disposed above the light transparent layer, wherein the scintillator layer has a first surface adjacent to the light transparent layer and a second surface on an opposite side to that of the first surface, and wherein the flat panel imager is configured such that x-rays traverse the photodiode layer before propagating through the scintillator layer.

11. The flat panel imager of claim 10, wherein a light intensity generated by the scintillator layer is greater near the first surface of the scintillator layer adjacent to the light transparent layer relative to the second surface of the scintillator layer.

12. The flat panel imager of claim 11, wherein the photodiode layer comprises a CCD-based sensor.

13. The flat panel imager of claim 11, wherein the photodiode layer comprises a CMOS-based sensor.

14. The flat panel imager of claim 11, further comprising a TFT layer disposed below the photodiode layer.

15. The flat panel imager of claim 10, wherein the scintillator layer comprises a phosphor scintillator.

16. The flat panel imager of claim 10, wherein the scintillator layer comprises a cesium iodide scintillator.

17. The flat panel imager of claim 10, wherein a mirror layer is disposed above the scintillator layer.

18. The flat panel imager of claim 17, wherein a protective layer is disposed below the photodiode layer.

19. The flat panel imager of claim 18, wherein a substrate layer is disposed between the protective layer and the photodiode layer.

20. The flat panel imager of claim 19, further comprising a casing that holds the flat panel imager together, wherein the casing forms an aperture window to receive x-rays.

21. A flat panel imager, comprising:
    a semiconductor layer disposed above a charge-collection layer; and
    a bias electrode layer disposed above the semiconductor layer, the bias electrode to generate an electric field within the semiconductor layer, wherein the semiconductor layer has a first surface adjacent to the charge-collection layer and a second surface adjacent to the bias electrode, and wherein the flat panel imager is configured such that x-rays traverse the charge-collection layer before propagating through the semiconductor layer, wherein electric charges drawn across the semiconductor layer are greater near the first surface of the semiconductor layer adjacent to the charge-collection layer relative to the second surface of the semiconductor layer.

22. The flat panel imager of claim 21, further comprising a TFT matrix layer disposed below the charge-collection layer.

23. The flat panel imager of claim 21, wherein the semiconductor layer comprises an amorphous selenium material.

24. The flat panel imager of claim 21, wherein the charge-collection layer comprises a plurality of charge-collection electrodes.

25. The flat panel imager of claim 21, further comprising a casing that holds the flat panel imager together, wherein the casing forms an aperture window to receive x-rays.

26. A digital radiography system, comprising:
an x-ray source to transmit x-rays;
a flat panel imager to receive the x-rays and to produce a digitized image, comprising:
a photodiode layer;
a light transparent layer disposed above the photodiode layer;
a scintillator layer disposed above the light transparent layer; and
a mirror layer disposed above the scintillator layer; and
a display system connected to the flat panel imager, the display system to display the digitized image, wherein the scintillator layer has a first surface adjacent to the light transparent layer and a second surface adjacent to the mirror layer, and wherein the flat panel imager is configured such that x-rays traverse the photodiode layer before propagating through the scintillator layer.

27. The system of claim 26, wherein a light intensity generated by the scintillator layer is greater near the first surface of the scintillator layer adjacent to the light transparent layer relative to the second surface of the scintillator layer.

28. The system of claim 26, wherein the photodiode layer comprises a CCD-based sensor.

29. The system of claim 26, wherein the photodiode layer comprises a CMOS-based sensor.

30. The system of claim 26, further comprising a casing that holds the flat panel imager together, wherein the casing forms an aperture window to receive x-rays.

31. The system of claim 30, wherein electric charges drawn across the semiconductor layer is greater near the first surface of the semiconductor layer adjacent to the charge-collection layer relative to the second surface.

32. The digital radiography system of claim 30, wherein the flat panel imager is a TFT-based imager.

33. The digital radiography system of claim 30, wherein the flat panel imager is a CCD-based imager.

34. A digital radiography system, comprising:
an x-ray source to transmit x-rays;
a flat panel imager to receive the x-rays and to produce a digitized image, comprising:
a semiconductor layer disposed above a charge-collection layer;
a bias electrode layer disposed above the semiconductor layer, the bias electrode to generate an electric field within the semiconductor layer; and
a casing that holds the flat panel imager together, wherein the casing forms an aperture window to receive the x-rays; and
a display system connected to the flat panel imager, the display system to display the digitized image, wherein the semiconductor layer has a first surface adjacent to the charge-collection layer and a second surface adjacent to the bias electrode, and wherein the flat panel imager is configured such that x-rays traverse the charge-collection layer before propagating through the semiconductor layer.

35. An imaging method, comprising:
transmitting x-rays through a single photosensitive device layer; and
receiving the x-rays incident on a scintillator layer after the transmission through the single photosensitive device layer.

36. The method of claim 35, wherein the scintillator layer is disposed above the single photosensitive layer, the scintillator layer having a first surface adjacent to the single photosensitive device layer and a second surface farther away from the single photosensitive device layer relative to the first surface, and wherein receiving further comprises receiving the x-rays at the first surface of the scintillator layer before the x-rays propagate through the scintillator layer.

37. The method of claim 36, wherein receiving further comprises generating a greater light intensity near the first surface of the scintillator layer adjacent to the single photosensitive device layer relative to the second surface of the scintillator layer.

38. The method of claim 37, further comprising detecting by the single photosensitive device layer visible light generated from the scintillator layer.

39. The method of claim 38, wherein a mirror layer is disposed adjacent to the second surface of the scintillator layer.

40. The method of claim 39, wherein a substrate layer is disposed below the photosensitive layer.

41. The method of claim 40, wherein a protective layer is disposed below the substrate layer.

42. An imaging method, comprising:
transmitting x-rays through a single charge collection-layer; and receiving the x-rays incident on a semiconductor layer after the transmission through the single charge-collection layer, wherein the semiconductor layer is disposed above the single charge-collection layer, the semiconductor layer having a first surface adjacent to the single charge-collection layer and a second surface farther away from the single charge-collection layer relative to the first surface, and wherein receiving further comprises receiving the x-rays at the first surface of the semiconductor layer before the x-rays propagate through the semiconductor layer.

43. The method of claim 42, wherein the semiconductor layer is disposed above the single charge-collection layer, the semiconductor layer having a first surface adjacent to the single charge-collection layer and a second surface farther away from the single charge-collection layer relative to the first surface, and wherein receiving further comprises receiving the x-rays at the first surface of the semiconductor layer before the x-rays propagate through the semiconductor layer.

44. The method of claim 43, further comprising generating an electrical field within the semiconductor layer.

45. The method of claim 44, wherein receiving further comprises generating a greater electrical charge near the first surface of the semiconductor layer adjacent to the single charge-collection layer relative to the second surface of the semiconductor layer.

46. The method of claim 45, further comprising detecting by the single charge-collection layer electrical charges drawn across the semiconductor layer.

47. The method of claim 46, wherein a mirror layer is disposed above the semiconductor layer.

48. The method of claim 47, wherein a protective layer is disposed below the single charge-collection layer.

49. A digital radiography imager, comprising:

an energy detection layer;

an x-ray converting layer coupled to the energy detection layer; and a single energy detection/x-ray converting interface in the imager, wherein the x-ray converting layer has a first surface adjacent to the energy detection layer and a second surface on an opposite side to that of the first surface and wherein the digital radiography imager is configured such that x-rays traverse the energy detection layer and the single energy detection/x-ray converting interface before propagating through the x-ray converting layer.

50. A method, comprising:

receiving x-rays in a scintillator layer; and transmitting the x-rays through a photosensitive device before the x-rays are received in any scintillator layer.

51. A digital radiography imager, comprising:

an energy detection layer; and a substrate comprising an x-ray converting layer, the substrate coupled to the energy detection layer, wherein the energy detection layer is coupled to receive light from the x-ray converting layer, wherein the digital radiography imager is configured such that x-rays traverse the energy detection layer before propagating through the substrate comprising the x-ray converting layer.

52. The digital radiography imager of claim 51, wherein the x-ray converting layer comprises a scintillating material to produce visible light from x-rays.

53. The digital radiography imager of claim 51, wherein the energy detection layer comprises photodiodes to detect the visible light.

54. The digital radiography imager of claim 51, wherein the x-ray converting layer comprises a semiconductor material to draw electrical charges across the semiconductor material.

55. The digital radiography imager of claim 51, wherein the x-ray converting layer comprises a photoconductor material to produce electrical charges across the semiconductor material.

56. The digital radiography imager of claim 51, wherein the energy detection layer comprises a plurality of charge-collection electrodes to collect the electrical charges.

57. A method, comprising:

providing a substrate;

receiving x-rays in an x-ray converting layer; and transmitting the x-rays through an energy detection layer before the x-rays are received in the x-ray converting layer and before the x-rays are received in the substrate.

58. The method of claim 57, wherein the x-ray converting layer comprises the substrate.

59. The method of claim 58, wherein the x-ray converting layer further comprises a scintillating material to produce visible light from x-rays.

60. The method of claim 58, wherein the energy detection layer further comprises photodiodes to detect the visible light.

61. The method of claim 58, wherein the x-ray converting layer further comprises a semiconductor material to draw electrical charges across the semiconductor material.

62. The method of claim 58, wherein the x-ray converting layer further comprises a photoconductor material to produce electrical charges across the semiconductor material.

63. The method of claim 58, wherein-the energy detection layer further comprises a plurality of charge-collection electrodes to collect the electrical charges.

* * * * *